US 6,640,055 B2

(12) United States Patent
Nishimura et al.

(10) Patent No.: US 6,640,055 B2
(45) Date of Patent: Oct. 28, 2003

(54) CAMERA HAVING A BUILT-IN AND SELF-CONTAINED FLASH LIGHTING SUB-ASSEMBLY (75) Inventors: Tomoki Nishimura, Kawasaki (JP); Hidenori Miyamoto, Urayasu (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/046,619

(22) Filed: Jan. 14, 2002

(65) Prior Publication Data
US 2002/0064385 A1 May 30, 2002

Related U.S. Application Data (63) Continuation of application No. 09/699,649, filed on Oct. 30, 2000, now abandoned, which is a continuation of application No. 09/313,094, filed on May 17, 1999, now Pat. No. 6,397,012.

(51) Int. Cl.[7] .............................................. G03B 15/03
(52) U.S. Cl. ....................................................... 396/178
(58) Field of Search ................................ 396/177, 178, 396/176, 205, 206, 542

(56) References Cited

U.S. PATENT DOCUMENTS 4,262,658 A * 4/1981 Frissora ...................... 354/126
4,357,087 A * 11/1982 Ikawa et al. ................. 396/177
4,601,562 A * 7/1986 Yoneyama et al. .......... 354/170
5,708,875 A * 1/1998 Hayakawa ................... 396/176
5,740,480 A * 4/1998 Kuhn, Jr. et al. ............ 396/177

FOREIGN PATENT DOCUMENTS

JP          06301094 A  * 10/1994  ........... G03B/17/02
JP         411327017 A  * 11/1999  ........... G03B/17/08

* cited by examiner

Primary Examiner—W. B. Perkey
(74) Attorney, Agent, or Firm—Erik B. Cherdak & Associates LLC (57) ABSTRACT Camera having a built-in and self-contained flash sub-assembly. The camera includes a body having a movable cover member, and a flash device for illuminating a subject to be imaged. The flash device includes a light emitting unit, a capacitor for supplying electric current to the light emitting unit to emit a flash of light, and a step-up circuit which, in accordance with a power source such as a battery, etc., charges the capacitor. The light emitting unit, the capacitor, and the step-up circuit are disposed in the moveable cover member of the body. The flash sub-assembly also may be disposed within a pop-up/out flash type unit supported by a camera body.

2 Claims, 8 Drawing Sheets

CAMERA HAVING A BUILT-IN AND SELF-CONTAINED FLASH LIGHTING SUB-ASSEMBLY

This application is a continuation application of U.S. patent application Ser. No. 09/699,649, which was filed on Oct. 30, 2000 now abandoned, which is a continuation of U.S. patent application Ser. No. 09/313,094, which was filed on May 17, 1999 now U.S. Pat. No. 6,397,012.

BACKGROUND OF THE INVENTION

1. Field of the Invention

The present invention relates to cameras and other imaging devices that include built-in flash lighting devices.

2. Description of the Related Art

As is well known, flash devices which emit light during photographic and other imaging operations often are equipped with a light emitting unit which projects light toward a subject, a capacitor which supplies electric current to the light emitting unit, and a step-up circuit which increases a power-source voltage to charge the capacitor. Often, such cameras are equipped with a body that includes a slide-type lens cover unit. Such slide-type covers are used to cover lenses and the like when not used to take images or photographs. On the other hand, such slide-type covers are slideable relative to the rest of a camera body to cause lenses to be exposed for photographic operations.

Often, cameras incorporating slide-type bodies also include flash devices that are mounted in cover units as described above. Unfortunately, only the light emitting units (e.g., flash tubes) of such flash devices are mounted in the cover. The capacitor and the step-up circuit typically are housed in the camera body and are arranged so that they are connected to each other by lead wires and the like. During photography, electric current is supplied to the light emitting unit from the capacitor via the lead wires.

Although quite popular, such camera and flash device construction has led to serious problems. For example, destructive stresses often are applied to lead wires and the like during times of movement of a slideable cover unit. Moreover, because lead wires and the like are interposed between the slideable cover and the rest of a camera body, there is a possibility that such connecting members break or otherwise become damaged (e.g., partially damaged as a result of frayed wires, etc.) resulting in poor/faulty electrical and data connections. Furthermore, because lead wires often are subjected to high voltage, there is a risk of accidental electric shock to camera operators.

Moreover, because it has been difficult to manufacture a single package to contain the step-up unit and capacitor, lead wires and the like often are placed outside of the slideable cover and are thereby exposed to the elements such as water which may come into contact with a camera, etc. Water penetration and contact with the high voltage devices of the typical flash unit pose a serious risk of accidental electric shock.

Thus, there exists a need to solve the aforementioned problems.

SUMMARY OF THE INVENTION

The present invention has as its principal object to solve the aforementioned problems associated with prior cameras and imaging devices that include built-in flash lighting devices. The present invention solves such problems by providing a camera having a built-in and self-contained flash lighting sub-assembly. The camera includes a body having a movable cover member, and a flash device for illuminating a subject to be imaged. The flash device includes a light emitting unit, a capacitor for supplying electric current to the light emitting unit to emit a flash of light, and a step-up circuit which, in accordance with a power source such as a battery, etc., charges the capacitor. The light emitting unit, the capacitor, and the step-up circuit are disposed in the moveable cover member of the body. The flash sub-assembly also may be disposed within a pop-up/out flash type unit supported by a camera body.

BRIEF DESCRIPTION OF THE DRAWING FIGURES

The present invention is described below with reference to the following drawing figures, of which.

DETAILED DESCRIPTION OF THE PREFERRED EMBODIMENTS

The present invention is now discussed with reference to the drawing figures (FIGS. 1–8) that were briefly described above. A discussion of each preferred embodiment of the present invention is followed by a corresponding discussion of its operation. Unless otherwise specified, like parts and processes are referred to with like reference numerals.

Figure 1:
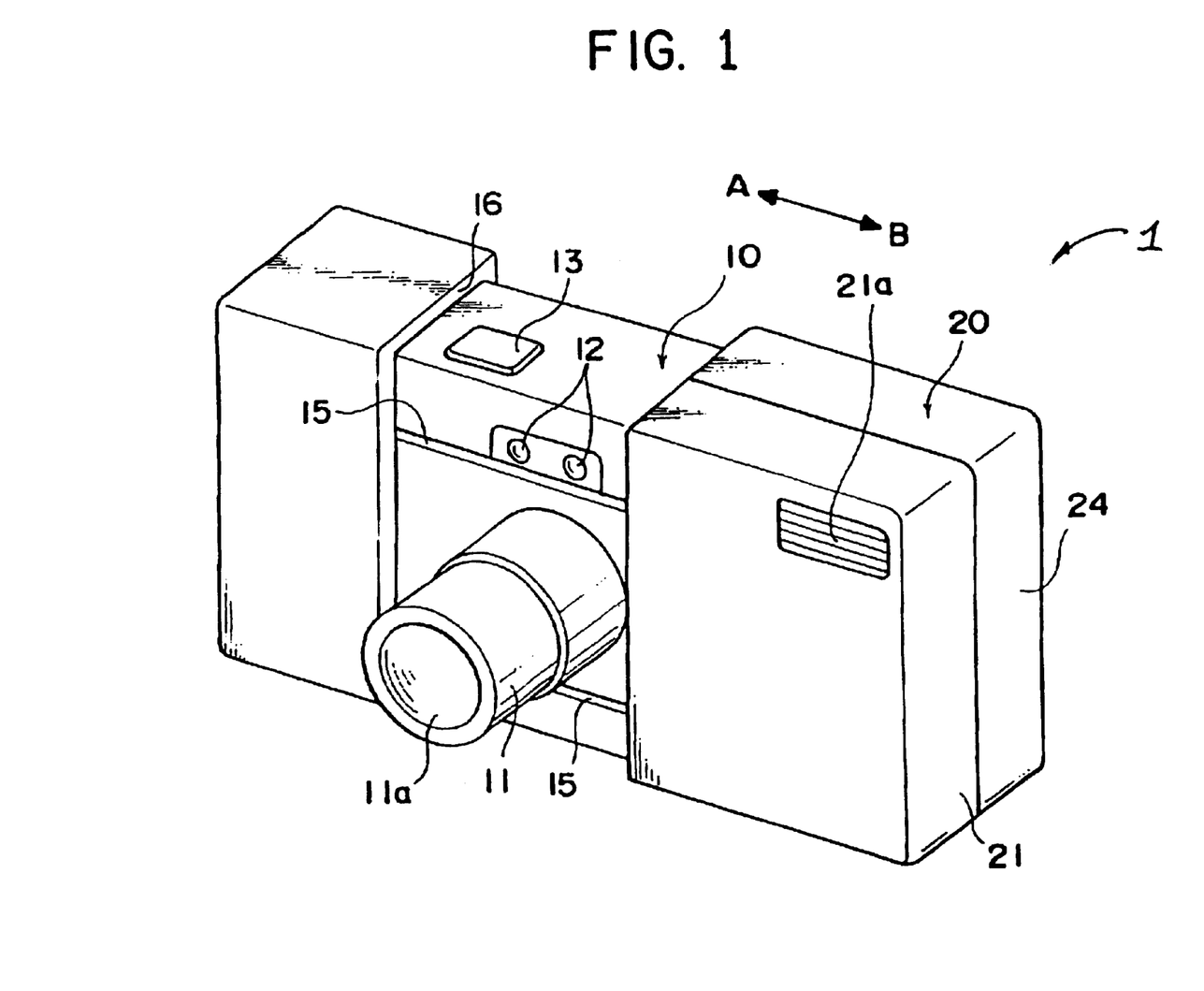
FIG. 1 is a perspective view of a camera having a slide-type camera body which includes a built-in flash lighting sub-assembly that is disposed in a slideable cover member which is shown in an open state according to a preferred embodiment of the present invention.

FIG. 1 is a perspective view of a camera having a slide-type camera body which includes a built-in and self-contained flash lighting sub-assembly that is disposed in a slideable cover member which is shown in an open state according to a preferred embodiment of the present invention. In particular, FIG. 1 shows a camera 1 having a slide-type camera body 10. A lens barrel 11 which projects in the forward direction of the camera and which supports a photographic lens 11a are disposed at the front of camera body 10. Additionally, up from the lens barrel 11 are light projecting and receiving windows 12 which are used for automatic focus (AF) detection. A release button 13 which may be operated (e.g., pressed) during photographic or imaging operations is disposed on the upper surface of camera body 10. A film cartridge 19 (FIGS. 4 and 5) is mounted in camera body 10 and houses a film F. Of course, if the camera is a digital or electronic camera, no film or film cartridge would be included.

Figure 2:
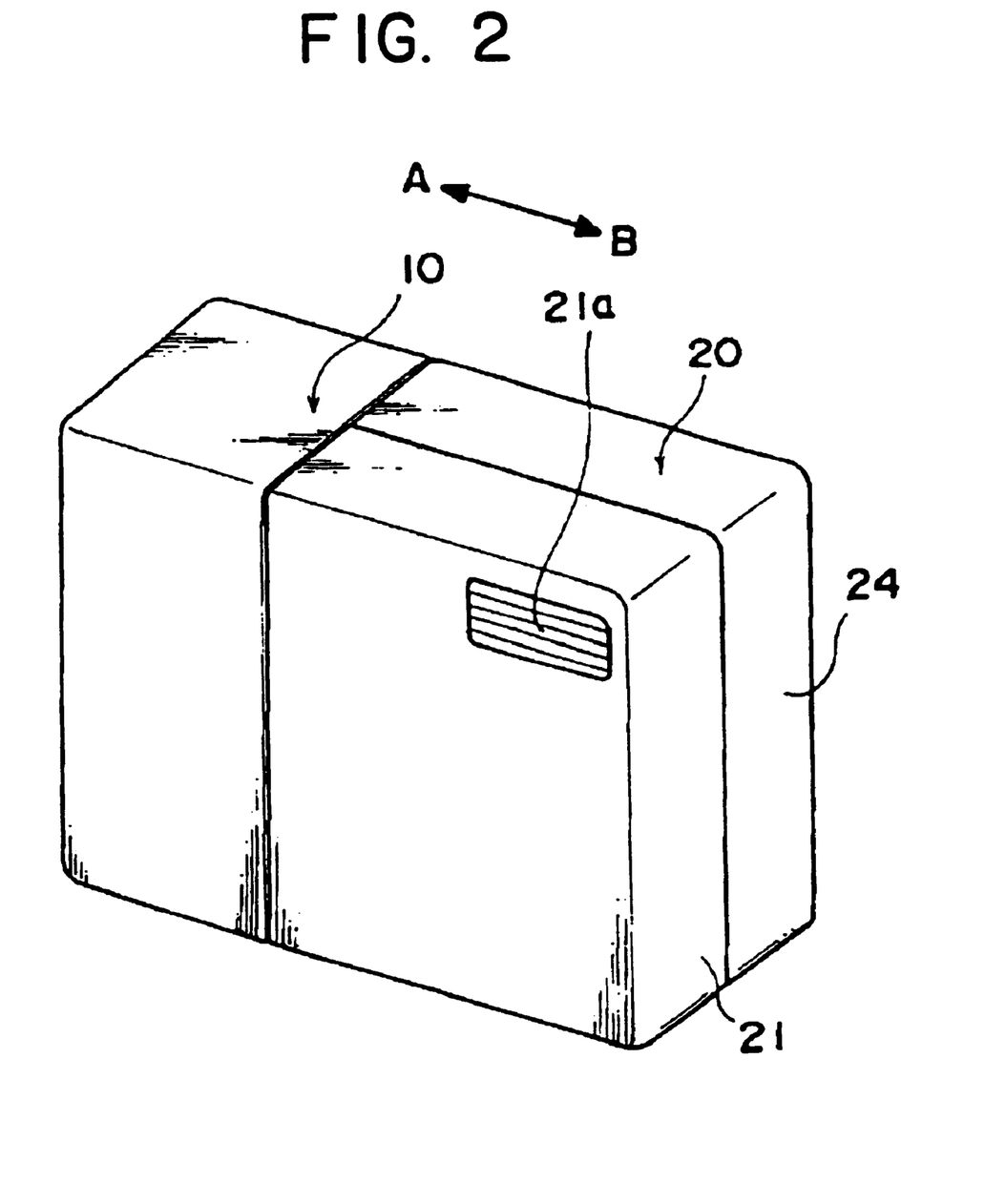
FIG. 2 is a perspective view of the camera shown in FIG. 1 in a closed state.

In FIG. 1, a slideable cover member (slide cover) 20 has been slideably mounted to move in the direction indicated by the directional line marked "A-B" in engagement with slide rail 15 of camera body 10. Slide cover 20 is shown in FIG. 1 in an open/pulled-out state. Accordingly, sliding slide cover 20 toward direction A to abut abutment surface 16, causes photographic lens barrel 11 to collapse (FIG. 5) so that lens 11a, light projecting and receiving windows 12, and release button 13 are enclosed by the slide cover 20 as shown in FIG. 2.

Figure 3:
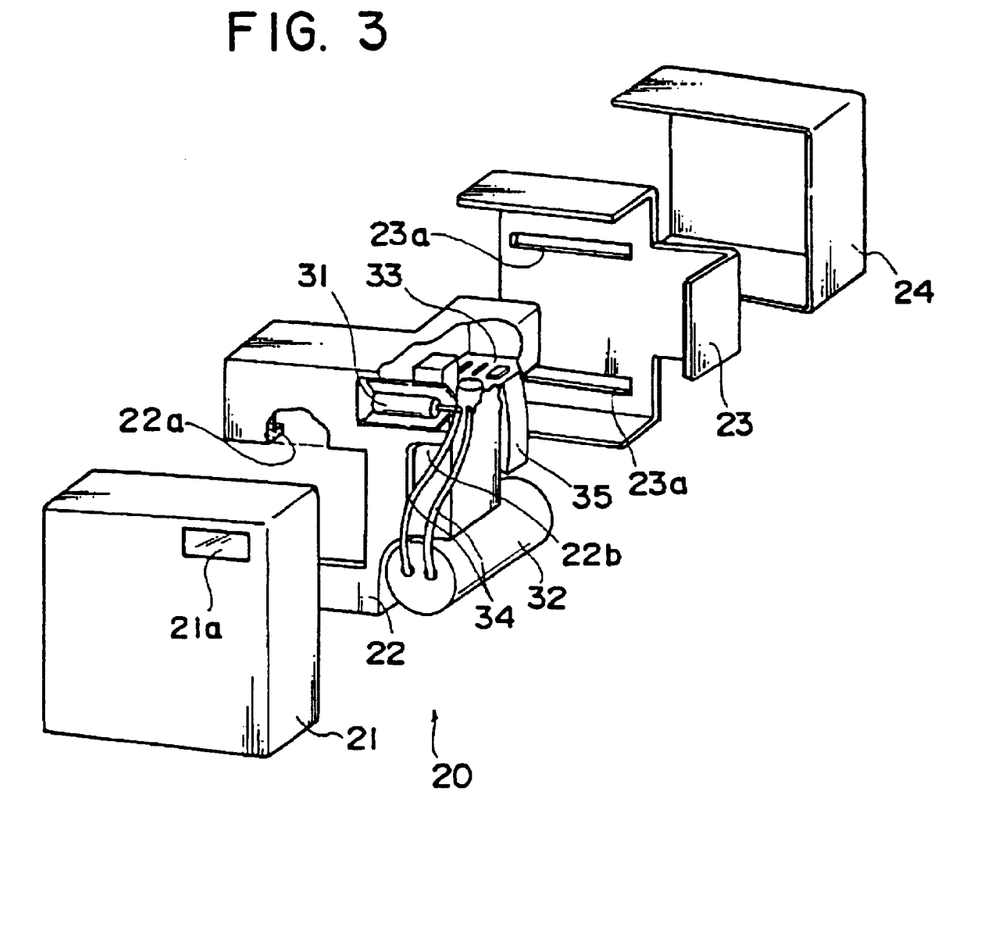
FIG. 3 is an exploded perspective view of the slideable cover member originally shown in FIG. 1.
Figure 4:
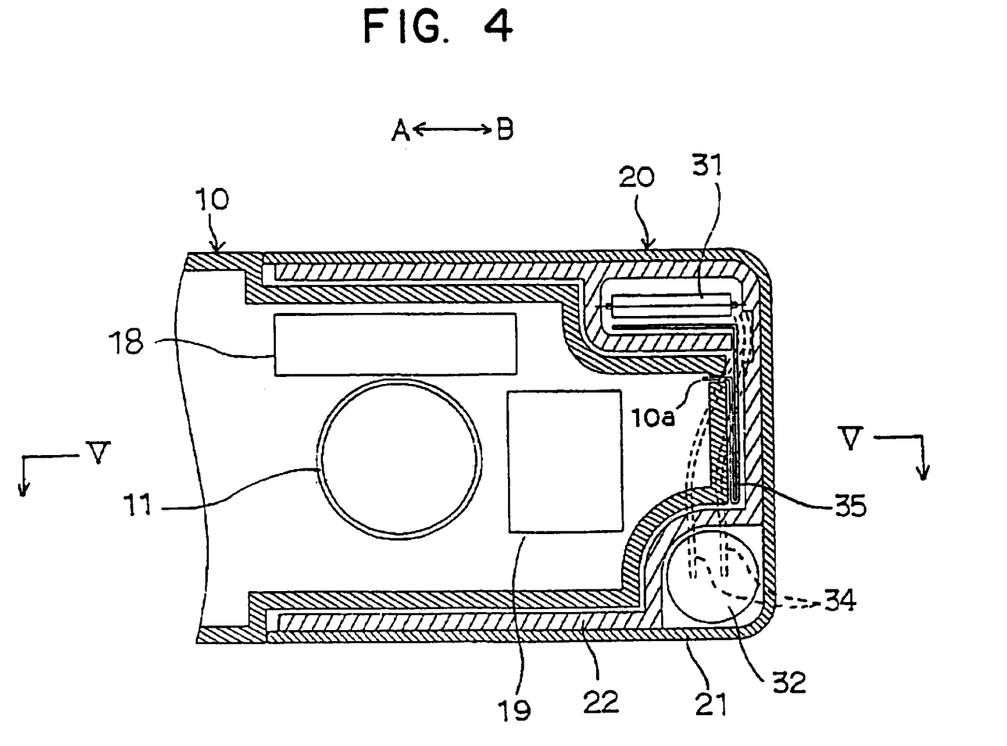
FIG. 4 is a cross-sectional diagram of the camera shown in FIG. 1 taken along a line perpendicular to an optical axis of thereof when the camera (and body thereof) is in a closed state.
Figure 5:
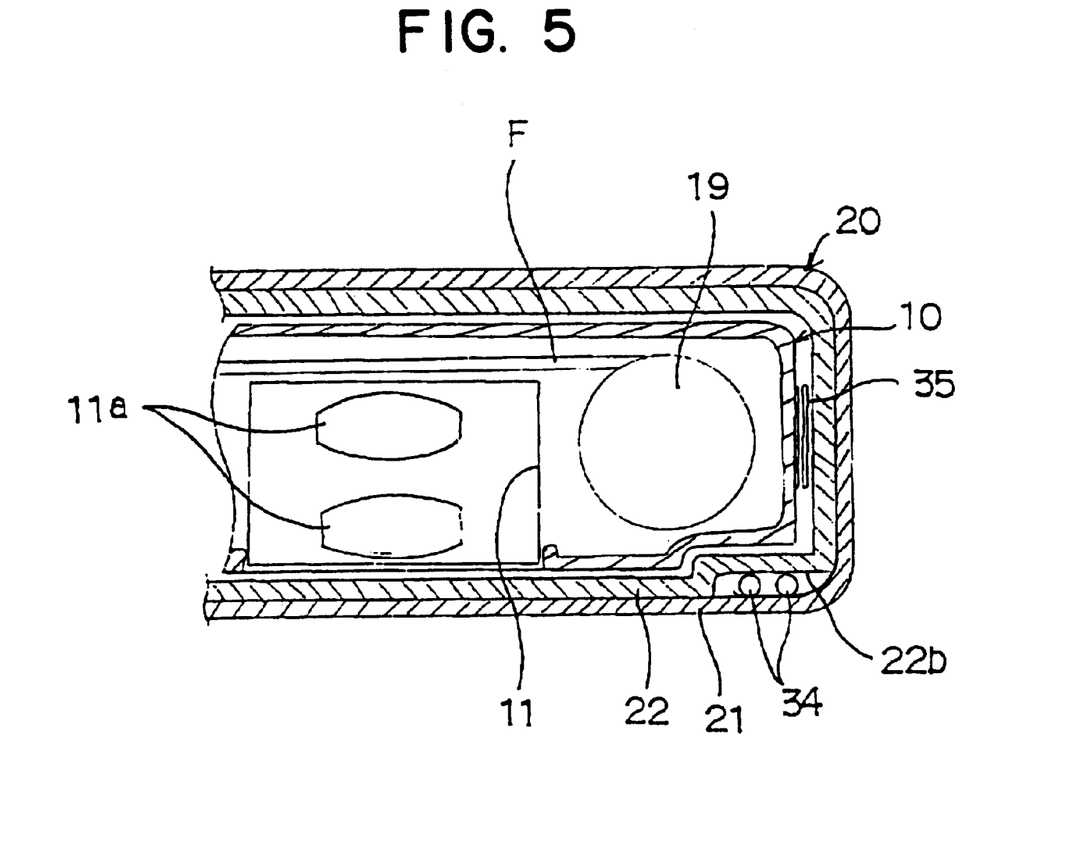
FIG. 5 is a cross sectional diagram taken along the line V—V as indicated in FIG. 4.

FIG. 3 shows an exploded perspective view of slide cover 20. FIG. 4 is a cross sectional diagram of the camera in a cross section at right angles to the photographic optical axis of the camera and, in particular, lens 11a. FIG. 5, as noted above, is a cross sectional diagram taken along the line V—V as shown in FIG. 4. As shown in FIGS. 3–5, slide cover 20 is equipped with a front slide cover 21 which covers the forward surface of the camera, a front engagement member 22 which engages with slide rail 15 of camera body 10 via a catch 22a, a rear engagement member 23 having a rail 23a formed to engage with a catch (not shown in the drawings) disposed in the rear surface of camera body 10, and a rear slide cover 24 which covers a rear surface of camera body 10. Front slide cover 21, front engagement member 22, rear engagement member 23, and rear slide cover 24 are configured to be together. Front engagement member 22 and rear engagement member 23 are housed within front slide cover 21 and rear slide cover 24 (see FIGS. 1 and 2).

Mounted in front engagement member 22 are a light emitting unit 31 (e.g., a flash tube, etc.) configured to emit flash light in the direction of a subject to be imaged/photographed, a capacitor 32 which stores and supplies an electric charge to light emitting unit 31, and a strobe control circuit board 33 which controls the charging of the capacitor and the timing of strobe light emission. A step-up circuit which produces the high voltage necessary while charging the capacitor 32 is disposed in the strobe control circuit board 33.

Capacitor 32 and strobe control circuit board 33 are connected via lead wires 34. As shown in FIGS. 3 and 5, lead wires 34 are housed in a space between front engagement member 22 and front slide cover 21 formed by a concave portion 22b of front engagement member 22. A light emission window 21a is disposed in front slide cover 21, as shown in FIGS. 1 and 3, in order to allow radiation of light projected by light emitting unit 31 in a direction toward a subject to be imaged/photographed.

Figure 6:
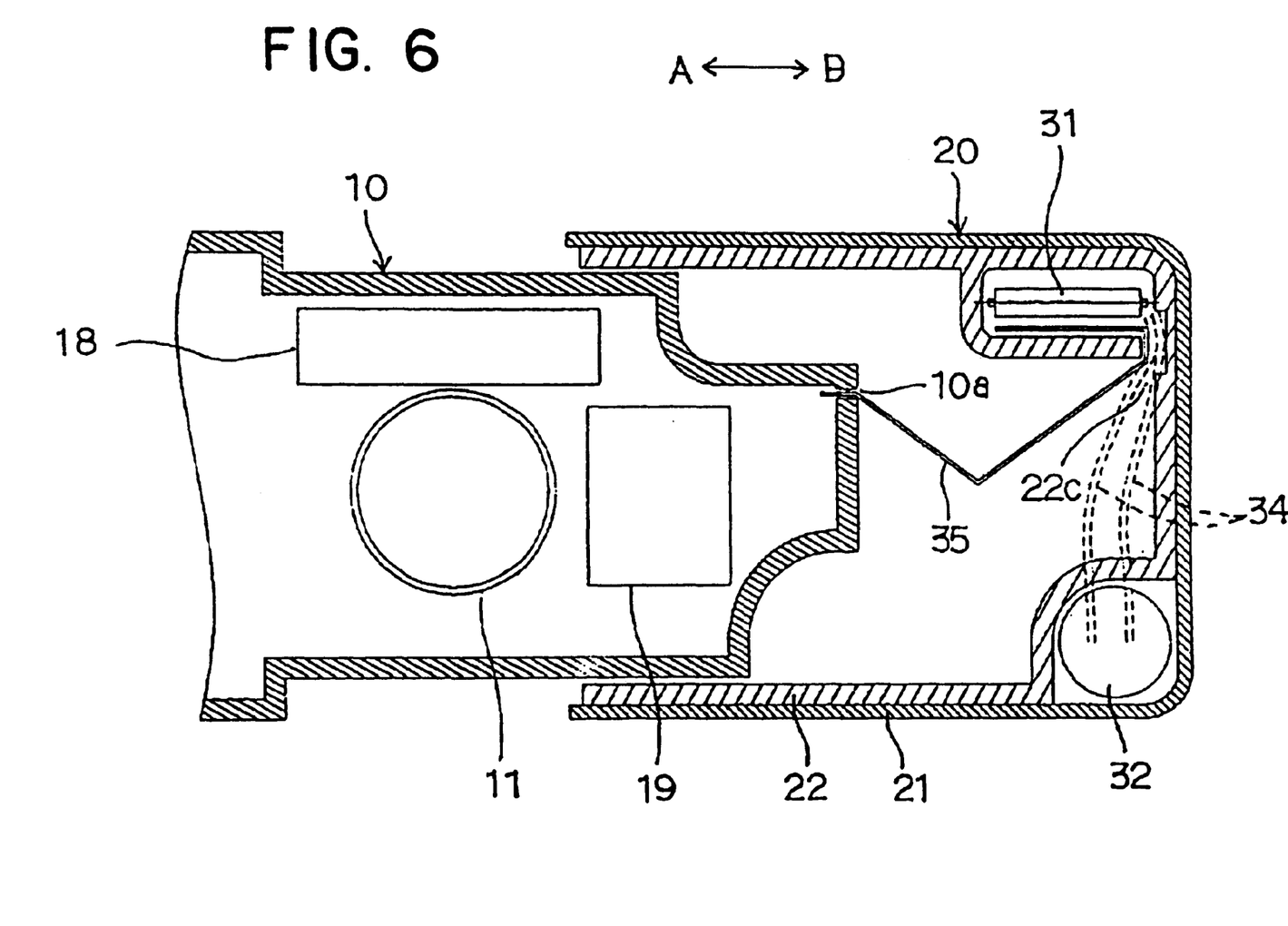
FIG. 6 is a cross-sectional diagram of the camera shown in FIG. 1 taken along a line perpendicular to an optical axis of thereof when the camera (and body thereof is in an opened (or pulled-out) state.

A flexible printed circuit board (FPC) 35 which extends from within camera body 10, is connected to strobe control circuit board 33. Strobe control signals are sent from a control circuit board 18 within camera body 10 to strobe control circuit board 33 via FPC 35. Additionally, a power supply voltage is supplied from a power source such as a battery (not shown in the drawing) within camera body 10 is communicated via FPC 35. When slide cover 20 is pushed in the direction marked as A in FIG. 1, FPC 35, as shown in FIG. 4, bends and is housed between camera body 10 and the slide cover 20. When the slide cover 20 is caused to move in the direction marked B in FIG. 1, FPC 35 extends, as shown in FIG. 6, so that the connection between strobe control circuit board 33 and camera body 10 is maintained. A pre-fabricated fold or bend is provided in FPC 35 so that it quickly and easily responds to movement of slide cover 20.

Operation of the flash lighting device of the camera shown in FIG. 1 is now described. First, when the power supply of the camera is placed into an ON state, the supply voltage of a battery, for example, is communicated via FPC 35 to a step-up circuit on strobe control circuit board 33, thus producing a high voltage for charging. The output of the step-up circuit is connected via a suitable series resistor to capacitor 32. Thereafter, the charging operation is performed via lead wires 34 until the necessary voltage is reached between the terminals of capacitor 32. On the other hand, during photography or other type imaging operations, a switching circuit disposed on strobe control circuit board 33 is set to an ON state and connects capacitor 32 and the light emitting unit 31 via lead wires 34. As a result, a large electric current is supplied from capacitor 32 to light emitting unit 31, and light emitting unit 31 thereafter emits flash light. This light is irradiated via the light emission window 21 to illuminate a subject to be photographed/imaged.

Front slide cover 21, front engagement member 22, rear engagement member 23, and rear slide cover 24 comprise an assembly that is encased to avoid destructive intrusion of the elements such as water, dust, etc. As a result, light emitting unit 31, capacitor 32, strobe control circuit board 33 and lead wires 34 are isolated from such elements. As such, risk of water damage and corresponding accidental shock are minimized. Moreover, because the FPC 35 extends from outlet 10a (FIGS. 4 and 6) of camera body 10 side, drops of water, for example, are prevented from penetrating to the interior of the camera body 10. Furthermore, in order to maintain a watertight structure, the joints of each member, or the terminals and the like of each electrical component, can be filled with a suitable silicone rubber or the like sealing compound or member.

Figure 7:
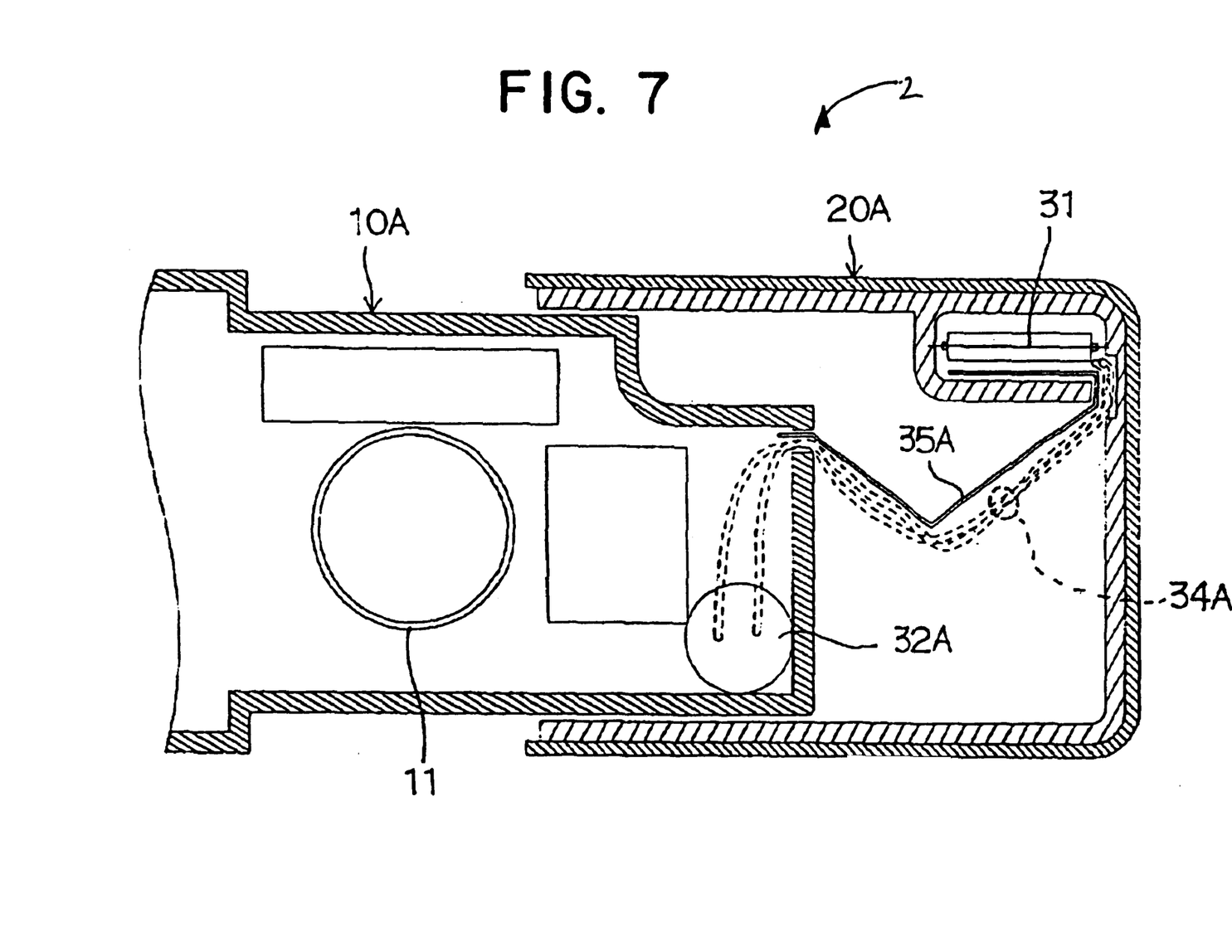
FIG. 7 is a cross-sectional diagram of a camera having a slide-type camera body which includes a built-in flash lighting sub-assembly that is disposed in a slideable cover member and which utilizes a capacitor disposed in the camera body according to a second preferred embodiment of the present invention.

Referring now to FIG. 7, depicted therein is a cross-sectional diagram of a camera 2 having a slide-type camera body which includes a built-in and self-contained flash lighting sub-assembly that is disposed in a slideable cover member and which utilizes a capacitor disposed in the camera body according to a second preferred embodiment of the present invention. As shown, a capacitor 32A is housed in camera body 10A. Because it is necessary to supply a large electric current to a light emitting unit 31 from capacitor 32A during photography, an FPC is not preferred. As such, lead wires 34 of larger cross sectional area have to be connected between camera body 10A and slide cover 20A in addition to FPC 35A which corresponds to FPC 35. However, because lead wires 34A become freely deformed, it is difficult to maintain an air/water tight arrangement, and drops of water may be allowed to penetrate to the interior of camera body 10A and slide cover 20A. Moreover, because lead wires 34A themselves are exposed to the exterior, the lead wires 34A easily get between the camera body 10A and the slide cover 20A. Because of this, the possibility of breakdown of the lead wires 34A becomes high. The lead wires 34A are portions subjected to a high voltage, and breakdown of the lead wires 34A may lead to electrical leakage and accidental electric shock.

In contrast, because the step-up circuit necessary for charging the capacitor 32 is disposed in the strobe control circuit board 33 in the camera of the first preferred embodiment as described above, a high voltage which exceeds the supply voltage of the battery is not applied to FPC 35, and lead wires 34 which supply electric current from the capacitor 32 to the light emitting unit 31 are housed within the slide cover 20. Moreover, because the FPC 35 does not freely deform like lead wires 34, the air tightness of the outlet portion can easily be maintained. Accordingly, potential problems with the camera shown in FIG. 7 are minimized by the preferred embodiment discussed above with regard to FIGS. 1–6.

It should be noted that while the a power source such as a battery is housed in camera body 10, the present invention is not so limited. The batter too, may be house in the slide cover.

Figure 8:
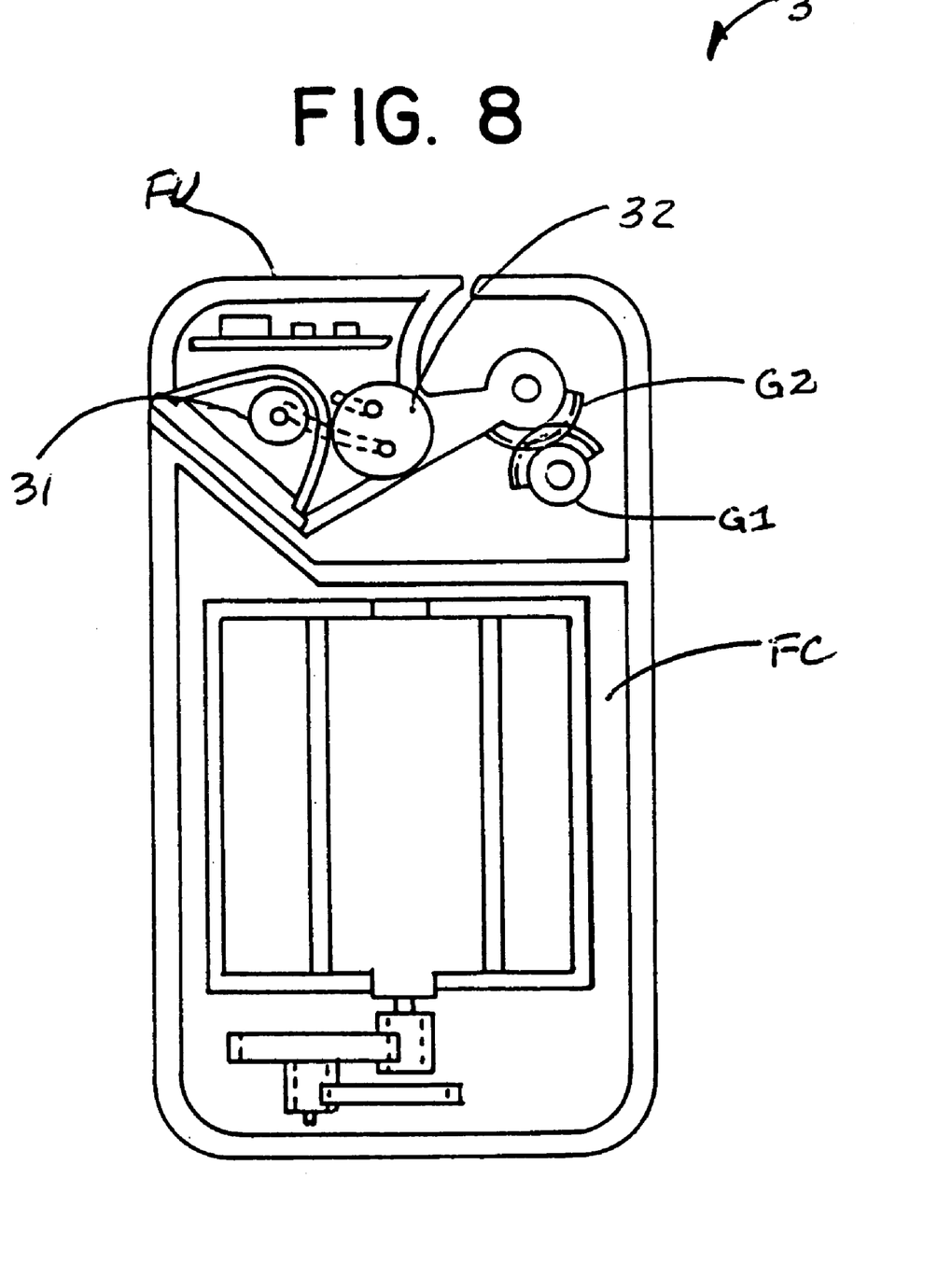
FIG. 8 is a cross-sectional diagram of a camera having a flip-up/out type built-in flash lighting sub-assembly provided in accordance with a third preferred embodiment of the present invention.

Referring now to FIG. 8, depicted therein is a cross-sectional diagram of a camera having a flip-up/out type built-in flash lighting sub-assembly provided in accordance with a third preferred embodiment of the present invention. Camera 3 includes a flip-up/out flash unit sub-assembly FU that further includes light emitting unit 31, and capacitor 32. A film compartment FC houses a film cartridge if camera 20-2 is so configured. Gears G1 and G2 are used to facilitate flip-up/out operation of sub-assembly FU. When flash illumination is needed, gear G1 turns (e.g., counter-clockwise) and, in turn, so too does gear G2. As a result, sub-assembly FU moves to an extended position. Since capacitor 32 is positioned within sub-assembly FU, lead wires are not needed (and, if used, are not damaged by movement of sub-assembly FU) as may be the case of the second preferred embodiment.

Generally, because a light emitting unit, capacitor, and step-up circuit are disposed in a slide cover and/or at least in part within a flip-up/out type sub-assembly, stress and other destructive forces are not applied to connecting members such as lead wires, etc., nor are such connecting members interposed between a slide cover and a camera body. As a result, the penetration of water drops and other elements can be prevented.

Thus, having fully described the present invention by way of example with reference to the attached drawing figures, it will be readily appreciated that many changes and modifications may be made to the invention and to the embodiments shown and/or described herein without departing from the spirit or scope of the present invention which is defined in and covered by the appended claims.

What is claimed is:

1. A camera having a built-in flash device, comprising:

a camera body supporting a photographic lens and having a slide cover movably disposed to cover and reveal a portion of said camera body; and said built-in flash device including a flash generation unit for generating a flash of light, a capacitor for supplying electric current to said flash generation unit, a step-up circuit for stepping up a battery voltage to charge said capacitor, and a line supplying electric current to said flash generation unit, said flash generation unit being disposed in said camera body, said line supplying electric current to said flash generation unit being formed from a flexible coupling member capable of expanding and contracting according opening and closing operations associated with said slide cover, wherein said flexible coupling member is a folding structure capable of extending and contracting in directions at approximately right angels with respect to the opening and closing operations of said slide cover.

2. A camera having a build-in flash device, comprising:

a camera body supporting a photographic lens and having a slide cover movably disposed to cover and reveal a portion of said camera body; and said built-in flash device including a flash generation unit for generating a flash of light, a capacitor for supplying electric current to said flash generation unit, a step-up circuit for stepping up a battery voltage to charge said capacitor, and a line supplying electric current to said flash generation unit, said flash generation unit being disposed in said camera body, said line supplying electric current to said flash generation unit being formed from a flexible coupling member capable of expanding and contracting according opening and closing operations associated with said slide cover, wherein said flexible coupling is foldable between an outer surface of said camera body and an inside surface of said slide cover.

* * * * *

Disclaimer and Dedication

6,640,055 B2 — Tomoki Nishimura, Kawasaki (JP); Hidenori Miyamoto, Urayasu (JP). CAMERA HAVING A BUILT-IN AND SELF CONTAINED FLASH LIGHTING SUB-ASSEMBLY. Patent dated Oct. 28, 2003. Disclaimer filed Mar. 31, 2006 by the Assignee, Nikon Corporation.

Dedicate to the Public and disclaims claims 1 and 2 of said patent.

(*Official Gazette May 23, 2006*)